(12) United States Patent
Tysowski et al.

(10) Patent No.: US 9,059,947 B2
(45) Date of Patent: *Jun. 16, 2015

(54) SYSTEM AND METHOD FOR PRIORITIZING AND DISPLAYING MESSAGES

(71) Applicant: BLACKBERRY LIMITED, Waterloo, CA (US)

(72) Inventors: Piotr Konrad Tysowski, Waterloo, CA (US); Michael Thomas Hardy, Waterloo, CA (US); Atif Khan, Waterloo, CA (US)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,321

(22) Filed: Aug. 8, 2013

(65) Prior Publication Data

US 2013/0325990 A1    Dec. 5, 2013

Related U.S. Application Data

(63) Continuation of application No. 11/739,370, filed on Apr. 24, 2007, now Pat. No. 8,621,024.

(51) Int. Cl.
*G06F 15/16* (2006.01)
*H04L 12/58* (2006.01)

(52) U.S. Cl.
CPC ............... *H04L 51/00* (2013.01); *H04L 51/14* (2013.01); *H04L 51/22* (2013.01)

(58) Field of Classification Search
CPC .......... H04L 51/00; H04L 51/14; H04L 51/22
USPC ........................................................ 709/206
See application file for complete search history.

(56) References Cited

U.S. PATENT DOCUMENTS 6,628,194 B1    9/2003  Hellebust et al.
7,359,947 B2    4/2008  Kelley et al.
(Continued)

FOREIGN PATENT DOCUMENTS

EP    1484703 A1    12/2004
EP    1569427 A     8/2005
(Continued)

OTHER PUBLICATIONS

"Saved Search", MozillaZine Knowledge Base, Mar. 15, 2006, pp. 1-3, http://kb.mozillazine.org/Saved_Search, accessed Dec. 12, 2006.
(Continued)

*Primary Examiner* — Chau Le
(74) *Attorney, Agent, or Firm* — Rowand LLP (57) ABSTRACT

A device and method for displaying received messages, such as email, SMS, IM, multimedia, and voicemail, are provided. Each of a plurality of received messages, initially unread, is associated with a value. The device concurrently displays a first message listing and a second message listing, the first message listing comprising entries for messages of the plurality of received messages associated with a value meeting a specified threshold, and the second message listing comprising entries for other messages of the plurality of received messages. When a message associated with a value meeting the specified threshold and having an entry in the first message listing is marked read, the displayed message listings are updated to remove the entry for the message from the first message listing and to include an entry for the message in the second message listing.

20 Claims, 6 Drawing Sheets

(56) References Cited

U.S. PATENT DOCUMENTS

| | | |
|---|---|---|
| 2002/0023135 A1 | 2/2002 | Shuster |
| 2002/0107925 A1* | 8/2002 | Goldschneider et al. ...... 709/206 |
| 2002/0120702 A1 | 8/2002 | Schiavone et al. |
| 2003/0013483 A1 | 1/2003 | Ausems et al. |
| 2003/0126136 A1 | 7/2003 | Omoigui |
| 2003/0154256 A1* | 8/2003 | Hadano et al. ............... 709/206 |
| 2003/0195937 A1 | 10/2003 | Kircher, Jr. et al. |
| 2003/0229673 A1 | 12/2003 | Malik |
| 2004/0239684 A1 | 12/2004 | McGuire et al. |
| 2005/0015451 A1 | 1/2005 | Sheldon et al. |
| 2005/0039136 A1 | 2/2005 | Othmer |
| 2005/0108338 A1 | 5/2005 | Simske et al. |
| 2005/0138552 A1 | 6/2005 | Venolia |
| 2005/0204009 A1* | 9/2005 | Hazarika et al. ............. 709/206 |
| 2005/0267944 A1* | 12/2005 | Little, II ...................... 709/207 |
| 2006/0010217 A1 | 1/2006 | Sood |
| 2006/0083358 A1 | 4/2006 | Fong et al. |
| 2006/0173961 A1 | 8/2006 | Turski et al. |
| 2006/0200530 A1 | 9/2006 | Tokuda et al. |
| 2007/0038610 A1 | 2/2007 | Omoigui |
| 2007/0162582 A1 | 7/2007 | Belali et al. |
| 2007/0168430 A1 | 7/2007 | Brun et al. |
| 2007/0179945 A1 | 8/2007 | Marston et al. |
| 2007/0288932 A1 | 12/2007 | Horvitz et al. |
| 2008/0086640 A1 | 4/2008 | Voss et al. |
| 2008/0126951 A1* | 5/2008 | Sood et al. .................... 715/752 |
| 2008/0235335 A1 | 9/2008 | Hintermeister et al. |
| 2013/0325990 A1* | 12/2013 | Tysowski et al. ............ 709/206 |

FOREIGN PATENT DOCUMENTS

| | | |
|---|---|---|
| EP | 1667388 A | 6/2006 |
| EP | 1718015 A1 | 11/2006 |
| WO | 02103967 A | 12/2002 |
| WO | 03058464 A1 | 7/2003 |
| WO | 2005115035 A | 12/2005 |
| WO | 2007040648 A1 | 4/2007 |

OTHER PUBLICATIONS

Extended European Search Report dated Aug. 14, 2007 from EP07106810.0, 10 pgs.

Lewis, M., "Designing for Human-Agent Interaction", Apr. 16, 2003, pp. 1-21, URL: http://usl.sis.pitt.edu/ulab/pubs/aaaipap.pdf.

Skinner, J.M., "Multi-Agent Systems and Mixed-Initiative Intelligence", LEF Grant report, published at least as early as May 29, 2007, pp. 1-18, www.csc.com/aboutus/lef/mds67_off/uploads/skinner_mixed_initiative_agents.pdf.

Dyson, E. (2004) 'Meta-mail: A Medium for Meaning', Release 1.0 Report, vol. 22, No. 6, 31 Jun. 2004, p. 9.

Venolia et al. (2001) 'Supporting Email Workflow', Microsoft Research Technical Report MSR-TR-2001-88, revised Dec. 2001, pp. 1-11.

Roecker et al. (2005) "Context-Dependnet Email Notification Using Ambient Displays and Mobile Devices" in H. Tarumi, Y. Li, T. Yoshida (Eds.): Proceedings of the International IEEE Conference on Active Media Technology (AMT'05), May 19-21, Takamatsu, Kagawa, Japan, pp. 137-138.

Examination Report dated Mar. 29, 2010 from CA2629603, pp. 1-2.

* cited by examiner

SYSTEM AND METHOD FOR PRIORITIZING AND DISPLAYING MESSAGES

REFERENCE TO PRIOR APPLICATIONS

This application is a continuation of U.S. application Ser. No. 11/739,370, filed Apr. 24, 2007, the entirety of which is incorporated herein by reference.

BACKGROUND

1. Technical Field

The present invention relates generally to the display of messages at a communication device, and in particular to the assessment of the relative importance of a message and its prominent display on the communication device.

2. Description of the Related Art

Communication devices, such as smart phones, personal digital assistants (PDAs), personal computers, and the like, are commonly used to receive, transmit, store, and display messages such as electronic mail (e-mail), short message service (SMS) messages, instant messages (IM), and even non-text messages such as voicemail messages. Such communication devices may be provided with a messaging application executable at the device to manage such messages, allowing the user to receive messages; read (or otherwise peruse or hear the contents) of the messages; and respond to, save, delete, and/or file the message in a folder on the communication device, as desired. The messaging application typically provides a user interface that displays the messages stored at the communication device, or at least a subset of those messages, to the user in chronological or reverse chronological order. The standard view of such messages is a listing of header information taken from the messages in a single message folder. In a user interface environment featuring windows or panes for displaying data, the listing may be displayed in a single pane; if the entire listing cannot be displayed in the pane, then the excess listings may scroll off the boundary of the pane, and the pane may be provided with scroll bars or controls to allow the user to scroll or page up or down the listing. In a communication device with limited display space, most of the display space may be taken up with a viewport displaying a portion of the listing, and the viewport may be scrollable to allow the user to scroll or page up or down through the listing. Thus, if the messaging application is configured to display the contents of the "inbox" of the communication device, which typically comprises all received messages, then if there is a large number of messages in the inbox the user will only be able to see a small subset of the listing of inbox messages at any given time; in order to see other messages in the listing, the user is required to scroll through the listing in the pane or viewport.

Messages that are sent to a recipient, such as the user of the communication device, may be marked by the sender with an "importance" or priority level, which is indicative of the sender's estimation of the importance of the message that is sent. Such importance levels are not mandatory, and may be ignored by a messaging application handling the received message. If the messaging application is configured to process the importance level of a received message, the user interface of the messaging application may be configurable to display messages in order of importance; the most important messages, with the highest importance level, would be displayed first (i.e., at the beginning of the listing), then the less important messages would follow. "Important" messages may also be displayed in the listing with an icon, such as an exclamation mark, flag, or arrow, as a visual indicator of its importance. Thus, such important messages can be easily identified from a glance at the message listing; the important messages are marked with a visual icon and/or displayed at the beginning of the listing in the pane or viewport. However, if the user habitually receives a large volume of messages at the communication device, these important messages will not be easily noticed by the user. If the messages are displayed in chronological or reverse chronological order, then the important messages will be forced further down the listing as newer messages are received, such that it is no longer displayed in the viewport or pane. In that case, the user will not be aware of the receipt of an important message without scrolling through the message listing until the message listing is viewable in the viewport or pane. Even if the messages are displayed in order of importance, if the user receives a large number of messages which were designated as important by their senders then earlier-received important messages will be forced further down the listing, and similarly will no longer be immediately viewable in the viewport or pane without scrolling through the listing. Thus, the user may miss reading and responding to an important message. Furthermore, even once the user has determined that the message is no longer important, the message will remain in the inbox listing, and its icon may visually distract the user from reading another important message. While this distraction could be removed by deleting or moving the message from the inbox, the user may not wish to delete or move the message.

It is therefore desirable to provide a system and method for displaying important messages on a communication device in a manner that increases the prominence of important messages in the message listing, and that reduces the likelihood that the user will miss reading a message determined to be important or of high priority.

BRIEF DESCRIPTION OF THE DRAWINGS

In drawings which illustrate by way of example only a preferred embodiment,

FIG. 7b is a further embodiment of the interface of FIG. 3a after use of the user interface of FIG. 7a.

DETAILED DESCRIPTION

Figure 1:
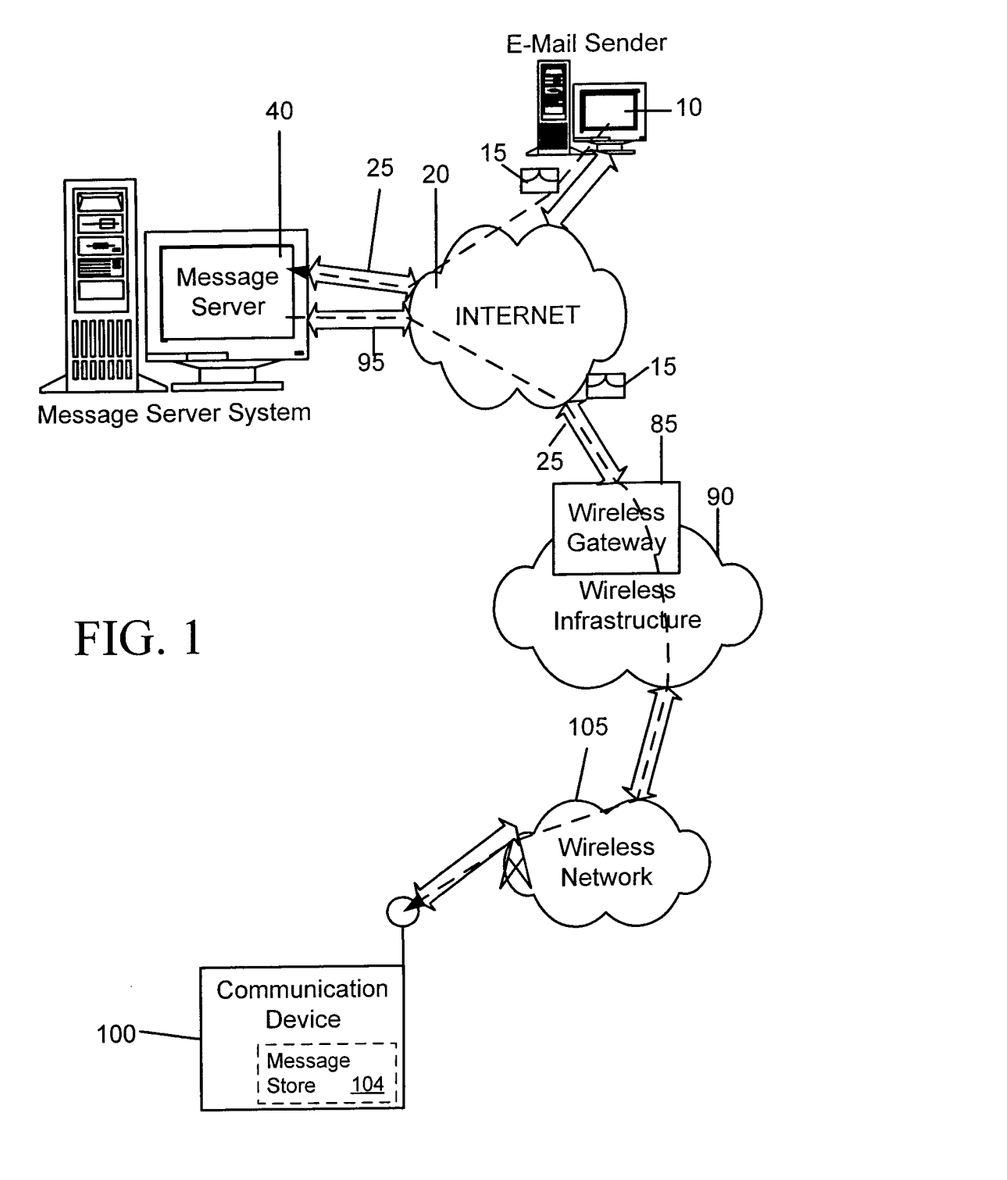
FIG. 1 is an overview of an example communication system in which a communication device employing the system and method of the preferred embodiment may be used.

Referring to FIG. 1, an overview of an exemplary system for use with the embodiments described below is shown. One skilled in the art will appreciate that there may be many different topologies, but the system shown in FIG. 1 helps demonstrate the receipt of messages at the communication device 100 as described in the present application. For example, there may be many user devices connected to the system that are not shown in the simple overview of FIG. 1. There may also be many message senders and recipients. The simple system shown in FIG. 1 is for illustrative purposes only.

FIG. 1 shows a message sender system 10, the Internet 20, a message server system 40, a wireless gateway 85, wireless infrastructure 90, a wireless network 105 and a communication device 100. A message sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online™ (AOL™). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Two common message servers are Microsoft Exchange™ and Lotus Domino™, which are often used in conjunction with Internet mail routers that route and deliver mail. These intermediate components are not shown in FIG. 1. Message servers such as the server 40 typically extend beyond just e-mail sending and receiving; they also include dynamic database storage engines that have predefined database formats for data like calendars, to-do lists, task lists, e-mail and documentation. The message server 40 may further be configured to receive multimedia messages comprising images, videos, rich text format content, and audio.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a message such as an e-mail message 15 is sent by an e-mail sender 10, located somewhere on the Internet 20. This message 15 is normally fully in the clear and uses traditional Simple Mail Transfer Protocol (SMTP), RFC 2822 (Request for Comment 2822 published by the Internet Society, "Internet Message Format"), headers and Multipurpose Internet Mail Extension (MIME) body parts to define the format of the mail message. If the messaging application utilized by the sender 10 allows for the indication of an "importance" level for the message, such an indication may be inserted into the header of the message, for example using the non-standard X-Priority: field with a value indicating the importance level of the message. The importance level may be designated with a character string or a numeric value; for example, "low", "normal", or "high" if there are three possible levels of importance assignable by the messaging application utilized at the sender system 10, or "0" for normal importance and "1" for high importance if only two levels of importance are assignable. These techniques are known to those skilled in the art.

The message 15 arrives at the message server 40 and is normally stored in a message store. In a preferred embodiment, messages addressed to a message server account associated with a host system such as a home computer or office computer which belongs to the user of a communication device 100 are redirected from the message server 40 to the communication device 100 as they are received, which is described in further detail with respect to FIG. 2. The user of the communication device 100 may handle messages received at the message server account at the home or office computer as well as at the communication device 100, by reading, replying to, forwarding, deleting, or archiving the received messages.

Regardless of the specific mechanism controlling the forwarding of messages to the communication device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Such wireless networks will be known to those skilled in the art.

Figure 2:
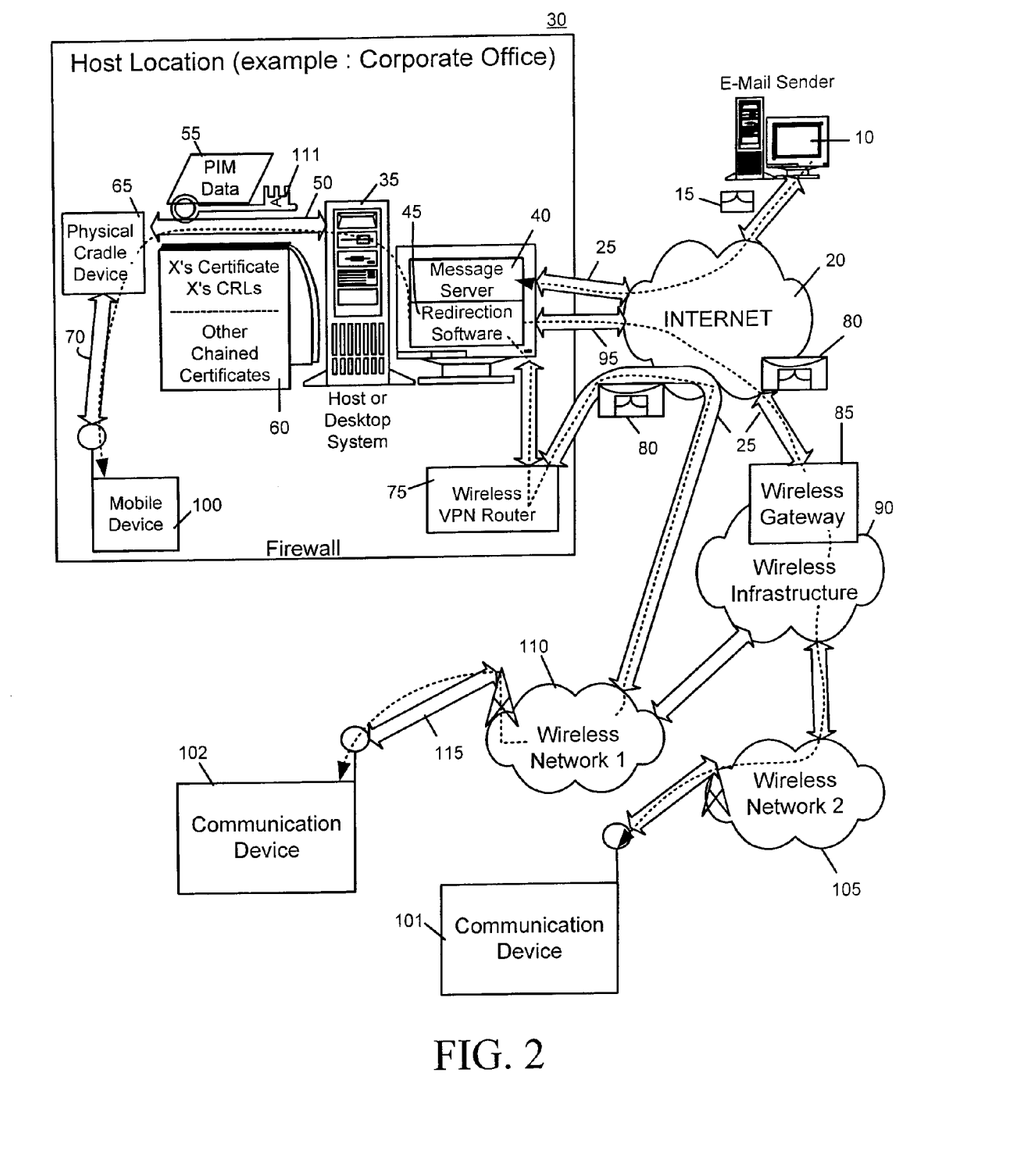
FIG. 2 is an overview of a further embodiment of the communication system depicted in FIG. 1.

FIG. 2 is a block diagram of a further example communication system including multiple networks and multiple mobile communication devices. The system of FIG. 2 is substantially similar to the system depicted in FIG. 1, but includes a host system 30, a redirection program 45, an optional mobile device cradle 65, a wireless virtual private network (VPN) router 75, an additional wireless network 110 and multiple mobile communication devices 100, 101, 102. As described above in conjunction with FIG. 1, FIG. 2 represents an overview of a sample network topology. Although the encoded message processing systems and methods described herein may be applied to networks having many different topologies, the network of FIG. 2 is useful in understanding an automatic message redirection system mentioned briefly above.

The central host system 30 will typically be a corporate office or other LAN, but may instead be a home office computer or some other private system where mail messages are being exchanged. Within the host system 30 is the message server 40, running on some computer preferably within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of one example of redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001 and incorporated herein by reference. This push technique may use a wireless-friendly encoding, compression and encryption technique to deliver all information to a mobile device, thus effectively extending the security firewall to include each mobile device 100 associated with the host system 30.

As shown in FIG. 2, there may be many alternative paths for getting information to the communication device 100. One method for loading information onto the communication device 100 is through a port designated 50, using an optional device cradle 65 which may be connected by a fixed or wireless link to the host computer 35, or by a direct connection with the host computer 35 without a cradle 65. This method tends to be useful for bulk information updates often performed at initialization of a communication device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. With a wireless VPN router, the VPN connection may be established directly through a specific wireless network 110 to a communication device 100. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the system of FIG. 2, a composed e-mail message 15 as described above, which may comprise an importance level designated by a sender of the message 15, leaving the e-mail sender 10 arrives at the message server 40 and is redirected by the redirection program 45 to the communication device 100. As the redirection takes place, the message 15 may be re-enveloped, reformatted, compressed and/or encrypted for delivery to the communication device 100. Preferably the outer envelope is used to maintain the addressing information of the original message except the sender's and the receiver's address. This allows reply messages to reach the appropriate destination, and also allows the "from" field to reflect the communication device 100 user's desktop address.

Figure 3:
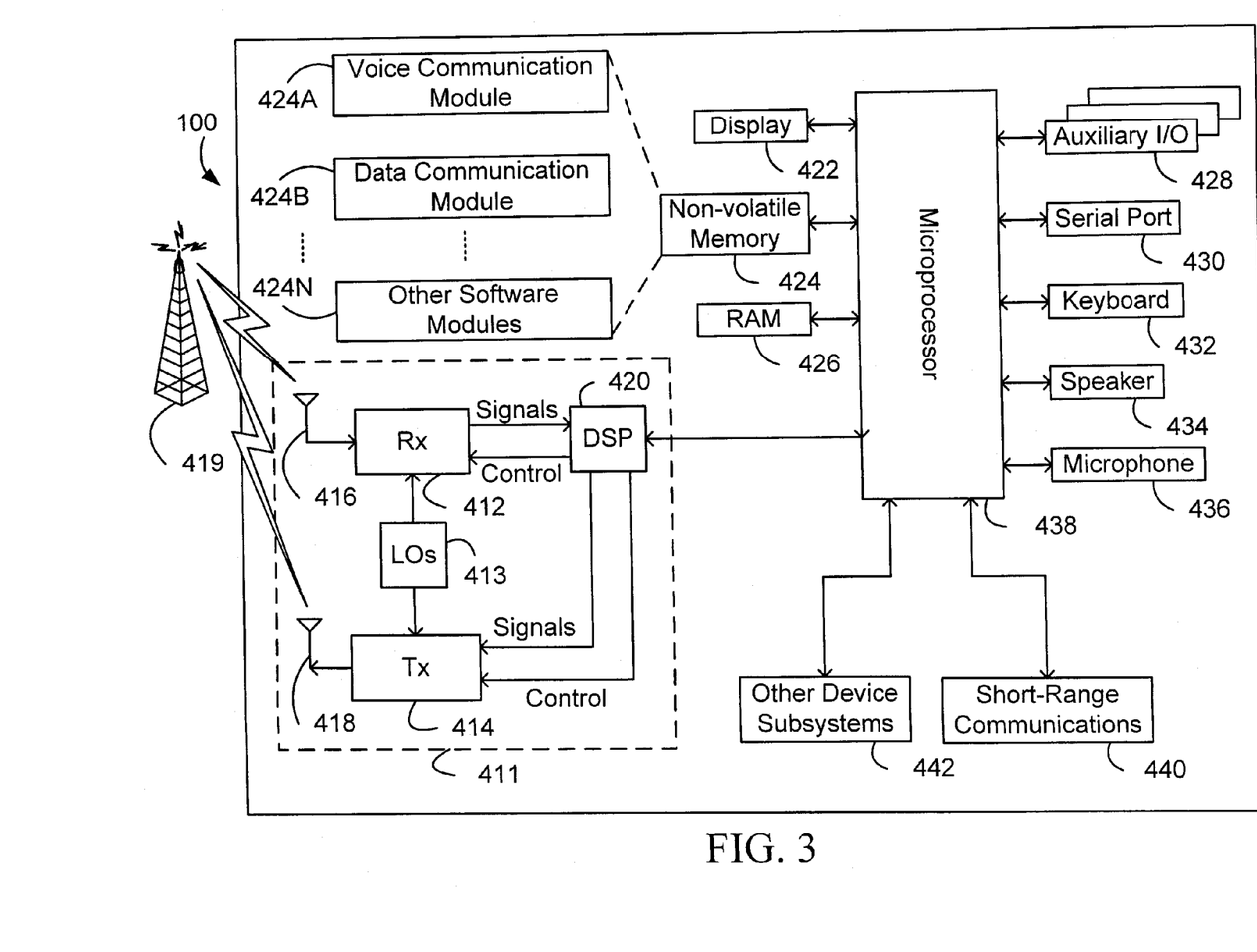
FIG. 3 is a block diagram of an embodiment of a communication device employing the system and method described herein.

It will be appreciated that the systems and methods disclosed herein may be used with many different computers and devices, such as a wireless mobile communications device 100 shown in FIG. 3. The communication device 100 depicted in FIG. 3 is a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442. The keyboard 432 and the display 422 may be used for both communication-related functions, such as entering a text message for transmission over a data communication network, and device-resident functions such as a calculator or task list or other PDA type functions. In FIGS. 4*a*, 4*b*, 5, 7*a*, and 7*b*, one auxiliary I/O device 428 is depicted as a trackball; it will be appreciated that the auxiliary I/O device 428 may comprise any other interface means appropriate for use on the communication device 100.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and are preferably embedded antennas. However, the systems and methods described herein are in no way restricted to a particular type of antenna, or even to wireless communication devices.

The communication device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 3 by the communication tower 419. These voice and data networks may be separate communication networks using separate infrastructure, such as base stations, network controllers, etc., or they may be integrated into a single wireless network.

The transceiver 411 is used to communicate with the network 419, and includes the receiver 412, the transmitter 414, the one or more local oscillators 413 and the DSP 320. The DSP 320 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 411 via a link between the DSP 420 and the microprocessor 438.

The detailed design of the transceiver 411, such as frequency band, component selection, power level, etc., will be dependent upon the communication network 419 in which the communication device 100 is intended to operate. After any required network registration or activation procedures have been completed, the communication device 100 may the send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418. In addition to processing the communication signals, the DSP 420 also provides for transceiver control.

The microprocessor 438 preferably manages and controls the overall operation of the communication device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the communication device 100 and a plurality of other voice or dual-mode devices via the network 419. Similarly, the data communication module 424B may provide a high-level user interface operable for sending and receiving data, such as e-mail messages, files, organizer information, short text messages, etc., between the communication device 100 and a plurality of other data devices via the networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Operating system software used by the microprocessor 438 is preferably stored in a persistent store such as non-volatile memory 424. The non-volatile memory 424 may be implemented, for example, as a flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the flash memory 424. Messages that are received by the communication device 100 may be processed by a software module 424N such as a messaging application that operates to present listings of messages in accordance with the preferred embodiment described below. The flash memory 424, in this embodiment, comprises a message store, which is a portion of the memory 424 storing data relating to or comprising messages. This message store is designated generally in FIG. 1 as well as message store 104.

A short-range communications subsystem 440 is also included in the communication device 100. The subsystem 440 may include an infrared device and associated circuits and components, or a short-range RF communication module such as a Bluetooth® module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

It will be appreciated that the mobile communications device 100 described with reference to FIG. 3, above, is but one exemplary device on which the systems and methods described herein may be implemented. The communication device 100 may comprise other devices that are configured to receive messages, comprising messages that can be stored digitally; this includes text and multimedia-based messages such as e-mail, as well as voicemail messages. Each of these messages, in a preferred embodiment, is displayable in a message listing as described below; thus, the communication device 100 may include a personal computer, laptop or tablet computer, PDA, smart phone, and the like.

Figure 4A:
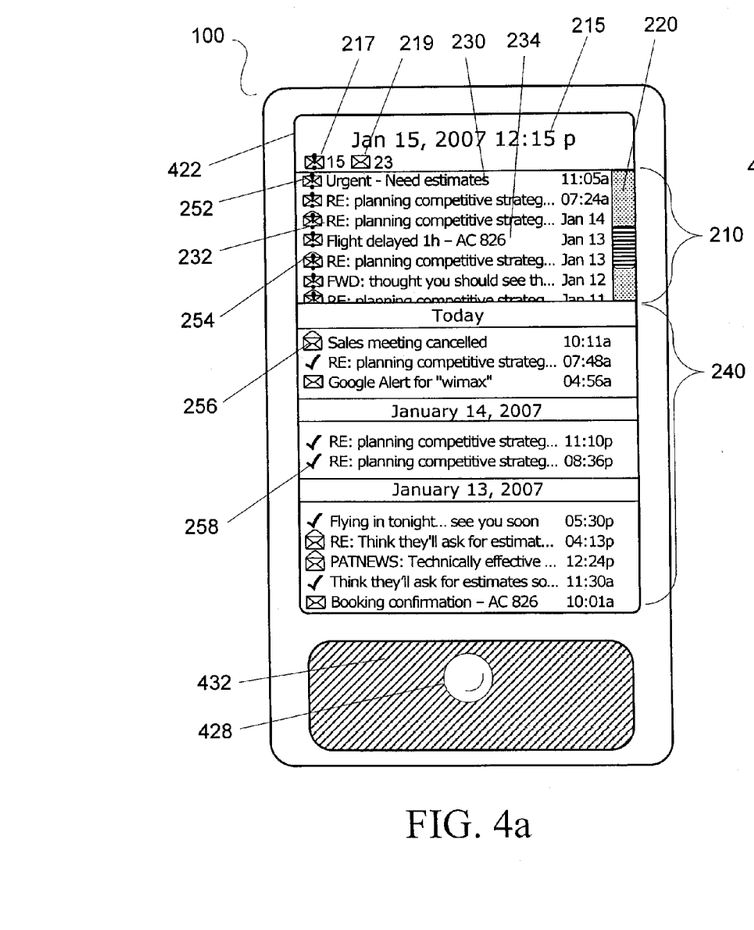
FIG. 4a is an exemplary user interface for higher and lower priority messages.

Turning to FIG. 4a, an exemplary user interface displayable on the display 422 of the communication device 100 is provided to illustrate the preferred system and method. For ease of reference, the communication device 100 is not shown with all components described in relation to FIG. 3. The keyboard 432 and an auxiliary I/O device 428 are generally represented in FIG. 4a. The user interface preferably comprises a banner or ribbon display 215, which may be used to convey information of general relevance to the user. Such information may include the current date and/or time; the number of received prioritized messages as yet unread by the user 217, as explained below; and the number of received messages as yet unread by the user 219. In the embodiment depicted in the accompanying drawings, the number of unread received messages 219 comprises a total number including the number of unread received prioritized messages 217. In an alternate embodiment, not shown here, the number of prioritized messages 217 reflects the total number of prioritized messages 217, whether read or unread.

The user interface shown in the display 422 further comprises a priority viewport 210. Most preferably, this viewport is not resizable on the fly by the user; that is, while the user is interacting with the user interface depicted in FIG. 4a, he or she cannot alter the proportion of the display 422 consumed by the priority viewport 210. In this way, the user is prevented from minimizing or eliminating the priority viewport from the user interface, thus ensuring that prioritized messages are brought to the user's attention. The priority viewport preferably comprises a scrollbar 220, or other navigation tool for use by the user in order to peruse the entire contents of the message listing displayable within the priority viewport 210. However, the user interface may be configured in a manner such that a scrollbar is not necessary, and activation of other means such as the keyboard 432 or the auxiliary I/O device 428 may allow for perusal of the entire contents of the priority viewport 210. For example, the non-prioritized message viewport 240, described below, is shown in this embodiment without a scrollbar.

The priority viewport 210 thus provides a fixed viewing area for viewing information relating to messages received at the communication device 100. The information is presented in the form of a message listing of data, preferably obtained from the header information of each message. As can be seen in FIG. 4a, a message listing entry 232 in the priority viewport may comprise elements such as an icon; text from the subject line of the message; and a date and/or timestamp. In a further embodiment, not shown, message listing entries may also comprise other elements, such as information regarding the sender and/or recipient; whether such details are included may depend on the space available for displaying a single message listing entry. In the example of FIG. 4a, the subject line data may be truncated due to space limitations, particularly if it is desired that each message listing entry occupy only a single line of text in the priority viewport 210. Messages listed in the priority viewport 210 that are received on the current day may be displayed with a timestamp; messages that were received on a date prior to the current day may be displayed with a datestamp only, such as entry 232. The messaging application operating on the communication device 100 may be configurable by the user or an administrator to display various combinations of the foregoing elements.

The icons displayable in the priority viewport may include an unread prioritized message icon 252, and a read prioritized message icon 254. Icons are not required in the priority viewport display, but are preferred so as to allow the user to quickly ascertain at a glance whether a particular message has been read or not; such icons may, of course, take a form other than that depicted in FIG. 4a. Other means of distinguishing "read" versus "unread" messages will be apparent to those skilled in the art; for example, the subject line of a message that is unread may be displayed in boldface type, while the subject line of a message that has been read may be displayed in a regular weight type, or different colours may be used for the text or the background of the listing entry.

Figure 7A:
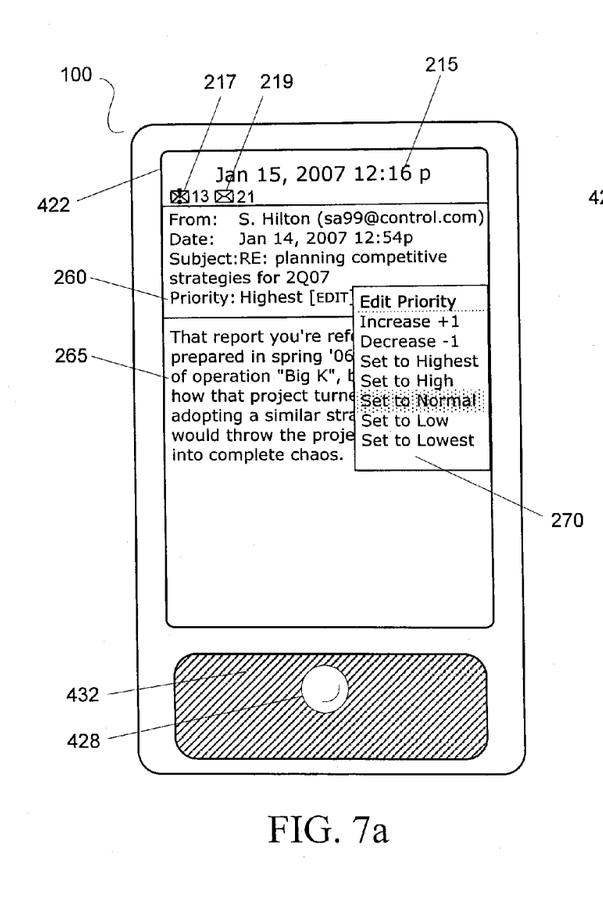
FIG. 7a is an exemplary user interface for overriding a dynamically assigned priority value.

It will be understood that, in accordance with conventional terminology used in the art, a "read" message is one that has been accessed by the user such that the user is able to peruse or review the entire content of the message, or one that the user has designated as having been "read" using a "mark as read" function available through the user interface, which is generally known in the art. In the case of an e-mail message, "reading" the message may be the action of instructing the communication device to display the content of the message in the display 422, as can be seen in the background of the display 422 in FIG. 7. Because it is presumed that the message, so displayed, has been read by the user, a message having been displayed in such a manner is often referred to as having been "read". However, it is possible that the user has not actually perused, reviewed, or even looked at or listened to the content of the message, even though it is considered to have been "read". Regardless, this terminology is employed because it will be understood by those skilled in the art. Similarly, a message that is "unread" is one that has not been accessed such that the user may have been able to peruse the entire content of the message.

In the example of FIG. 4a, it can be seen that the prioritized messages displayed in the priority viewport 210 are arranged in reverse chronological order. The messages may be ordered in other manners, including, but not limited to, chronological order and in order of priority. In the particular example of FIG. 4a, it can be seen that there are more messages than there is space for display in the priority viewport 210, as the number of unread important messages as indicated by the indicator of unread important messages 217 is fifteen, and only six prioritized message listing entries are visible in the priority viewport 210 (along with one partially displayed entry).

The nature of a prioritized message is preferably determined not only with reference to a designated importance level that may be established by a sender of a message 15, but also with reference to its characteristics and its treatment by the user of the communication device 10. The determination of a received message as a prioritized message may be seen with reference to FIG. 6. Preferably, certain evaluation events, such as the receipt of a message, determination that a previously received and unread message has been awaiting user operation for at least a preset time interval, or a user operation on a received message, trigger the determination of the message's priority level.

The receipt of a message may be the determination by the communication device 100 that a new message to be handled by the messaging application 424N comprising the user interface depicted in FIG. 3a has arrived at the communication device 100, for example in accordance with one of the methods described above with reference to FIGS. 1 and 2. This message, as noted previously, may have a designated importance level assigned by the sender of the message, which may be stored in association with the message in a header field.

The communication device 100 may determine that a message as yet unread has been awaiting user operation for at least a preset time interval. At a frequency determined by a preset time interval, which may be configurable by the user or an administrator (for example, every 30 minutes, once per hour or once per day, and so on), the messaging application 424N checks all unread messages to determine whether each message has been awaiting user operation for longer than the preset time interval. If an unread message is determined to have been awaiting user operation for longer than this preset time interval, then the detection event has occurred, and the message can be said to have reached or exceeded a certain "age", as defined by the preset time interval. The user operation on a message may include any of the normal actions taken on a message, such as: reading the message, or at least, opening or accessing the message for reading; deleting the message; moving the message into a subfolder or alternate storage location, such as a message archive, from that with which it was originally associated when first received at the communication device 100; replying to the message, for example by executing a "reply" command when the message is selected; and forwarding the message, for example by executing a "forward" command when the message is selected. In a further embodiment, the user operation may be a command to alter or edit the priority level of a prioritized or non-prioritized message.

Turning back to FIG. 6, when an event is detected at the communication device at step 300, the communication device 100 determines whether the event is a receipt of a new message, or another event such as user operation or a determination that the message has reached or exceeded a predetermined age at step 305. It may be noted that this step 305 need not be an explicit query or lookup of the nature of the event detected, but rather may be bypassed by the messaging application 424N; when a message is received, the messaging application may be configured to proceed with steps 310 through 350, as described below. Thus, if the event is detected with respect to a message previously received at the communication device 100, it necessarily comprises a user operation or aging event, and the branch comprising steps 315 and 325 is followed.

Figure 6:
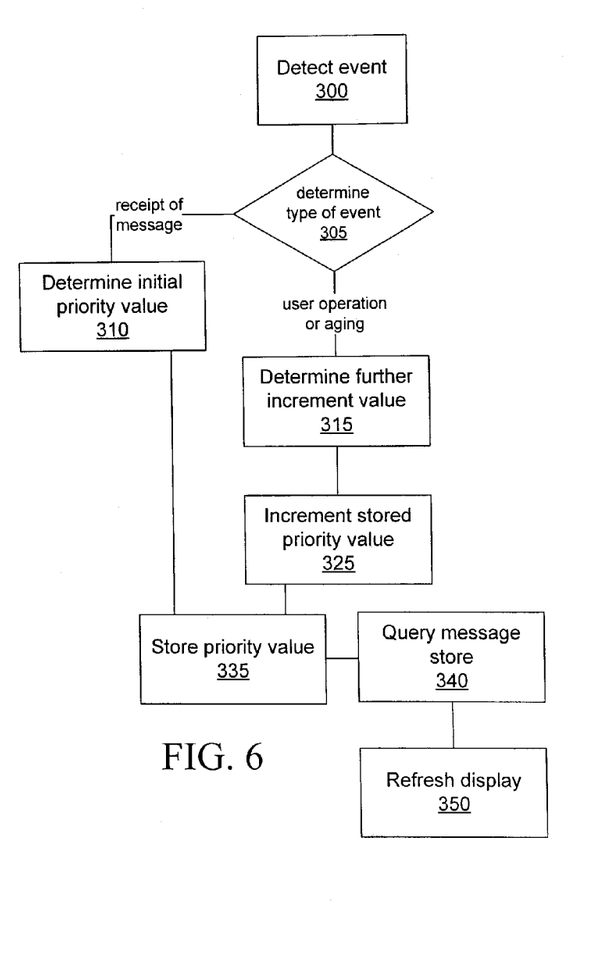
FIG. 6 is a flowchart of a method for dynamically associating a priority value with a message and for dynamically displaying messages.

If the event is the receipt of a message, then the communication device 100, preferably through execution of the messaging application 424N, determines an initial priority value for the message. This initial priority value may be a default value (for example, "0" or "normal"), or it may be a value that is provided in optional header information (such as the X-Priority: field, described above). The initial priority value may alternatively be determined by another process or evaluation that is known in the art. However the initial priority value is determined, it is stored in association with the message at the communication device 100, preferably in the message store, at step 335. The priority value may be embedded in the message itself, for example in a custom header field (e.g., X-Display-Priority: 2), or it may be stored separately from the message itself in the message store.

Figure 5:
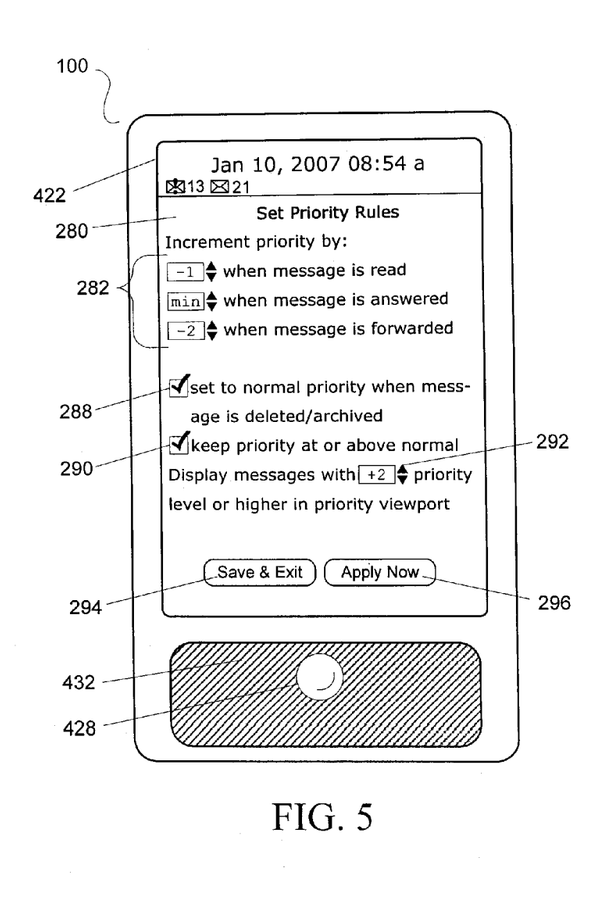
FIG. 5 is an exemplary user interface for defining priority rules.

If the event is not receipt of the message, then the messaging application 424N determines an increment value at step 315. This increment value may be determined by the nature of the event itself. FIG. 5 depicts an example options screen 280 displayable using the messaging application 424N, which represents a user-configurable set of options for establishing increment values relating to user operations of reading, replying ("answered"), and forwarding the message 282. It can be seen from FIG. 5 that the user may enter or select positive or negative increment values for each operation. The user may optionally configure the increment to automatically elevate the priority value of a message meeting certain parameters to the maximum or minimum possible level, if the messaging application 424N is configured with a maximum or minimum level, for example as shown in options 282; as configured, when a message is answered it is demoted to the minimum possible level, as indicated by the value "min" in the corresponding field. The user may also optionally configure the messaging application 424N such that no priority value may be decremented (i.e. incremented by negative increment values) below the "normal" priority range with option 290. It will be appreciated that while text descriptions of priority levels, such as "lowest", "low", "normal", "high", and "highest" may be employed in a user interface, the representation of these priority levels may as numeric values, where 0 is "normal", a negative value represents priority lower than normal, and a positive value represents priority higher than normal. In such a system, messages may be prioritized according to a continuum or range of priority levels. In an alternate embodiment, there may be only two priority levels, "normal" (0) and "high" (1). Thus, even if the characteristics of the message result in what would be equivalent to a +2 increment, the priority level would remain as "high". Similarly, in the embodiment shown in FIG. 5, user operations such as deletion or archiving may be configured to be associated with a decrement (or increment, as the case may be) of the priority level of the message to "normal" at 288. The options screen 280 may also comprise a "Save & Exit" button or option 294, and an "Apply Now" button or option 296. In the preferred embodiment, "Save & Exit" 294 saves the settings currently entered in the options screen 280; "Apply Now" 296 forces the application of these settings to all messages stored in the message store. Thus, the user operations referenced above may even include the detection of the "Apply Now" command. Thus, for example, if the messaging application 424N receives a command to forward a received message, the messaging application 424N detects this event as an event associated with an increment of −2. The messaging application 424N then retrieves the priority value stored in association with that message, and increments the priority value with the further increment value at step 325. The priority value is then stored at step 335, as described above.

If the event is a determination that an unread message has reached or exceeded a certain age, then the messaging application 424N may increment or decrement the priority value on a one-time-only basis, or on a repeating basis. If the messaging application 424N determines a new priority value for a message each time the preset time interval passes, then this event resulting in a determination of an increment value (step 315) and an increment of the stored priority value (step 325) occurs on a repeating basis. Thus, if a message remains unread for an extended period of time spanning multiple preset time intervals, the message's associated priority value will continue to increase (or decrease, if the increment is negative) to a maximum (or minimum) value. The determination event is carried out on a one-time-only basis if the messaging application 424N only carries out steps 315 and 325 the first time the unread message reaches or exceeds a predetermined age (i.e., after a first preset time interval).

Thus, it can be seen that the foregoing steps are preferably carried out throughout normal operation of the communication device 100, as it receives and processes messages, and as the user carries out operations on those messages. In the preferred embodiment, those messages that have a stored priority value above a certain threshold, or equal to or greater than a certain threshold, are considered to be the "prioritized" messages to be listed in the prioritized message listing displayed in the priority viewport 210. Turning back to FIG. 5, preferably the options screen 280 provides a user-configurable threshold 292 for determining the minimum priority level for a message in order for it to be displayed in the priority viewport 210 rather than in the non-priority viewport 240. Upon completion of step 335 in FIG. 6, preferably the communication device 100 then queries the message store at step 340 in order to build a list of all messages, or references to all messages, having a priority value meeting the threshold for display in the priority viewport 210, and then updates or refreshes the user interface in the display 424 by updating the prioritized message listing entries in the priority viewport 210, and the non-prioritized message listing entries in the non-priority viewport 240. Thus, all messages having at least a certain priority level are displayed in the priority viewport 210 only, separate and apart from all non-prioritized messages.

As can be seen in FIG. 4a, the priority viewport 210 shares space on the display 422 with a non-prioritized message viewport 240. In the preferred embodiment, the non-prioritized message viewport 240 displays non-prioritized messages in a similar order as the priority viewport 210; here, it can be seen that the messages are in reverse chronological order, with separators indicating the date of the message. In this embodiment, it can also be seen that the non-priority viewport 240 listing includes messages that were not received by the communication device 100, but rather were transmitted by the communication device 100. Thus, for example, the non-prioritized message 256 is indicated by an open envelope icon, signifying that it had been received and read; the non-prioritized message 258 is indicated by a checkmark icon, indicating that it had been transmitted from the communication device 100. Although the preferred embodiment illustrated in FIG. 4a presents the message listing in reverse chronological order, it will be appreciated that in further embodiments, the messages may be listed in another order, such as forward chronological order, or may be sorted according to other indicia associated with each message, such as subject line, sender, or priority level. More than one sort or order may be applied to the message listing; for example, messages may be listed in order of decreasing priority level, but also in reverse chronological order within each set of messages having a given priority level. Furthermore, the order in which the messages are presented in the priority viewport 210 and the non-prioritized message viewport 240 may be the same, or differ. Thus, for example, the messages listed in the priority viewport 210 may be listed in order of decreasing priority value, whereas the messages listed in the non-prioritized message viewport 240 may be listed in reverse chronological order only.

Figure 4B:
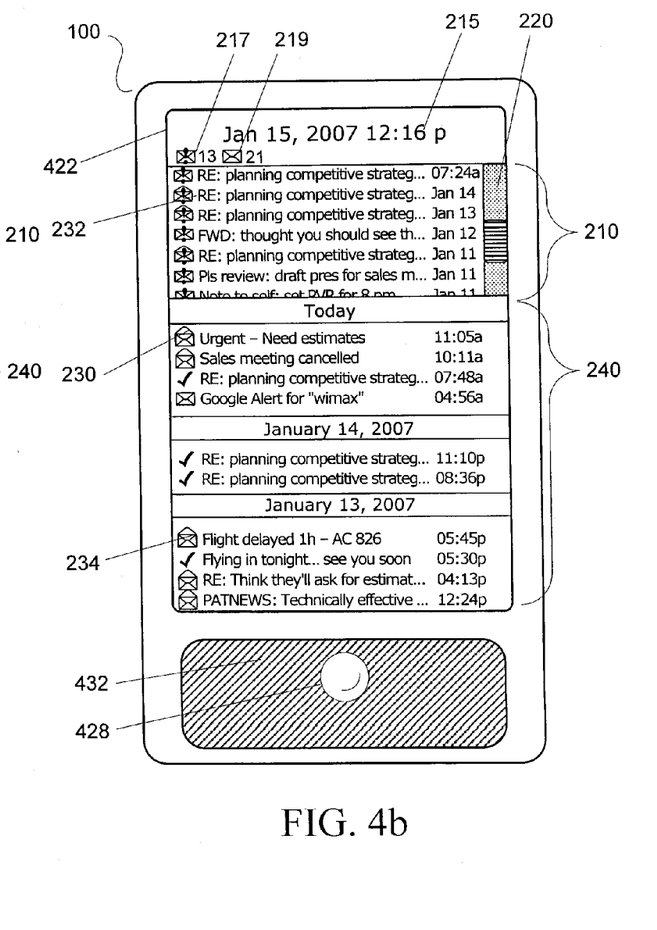
FIG. 4b is a further embodiment of the interface of FIG. 3a after user activity.

FIG. 4b shows a further embodiment of the user interface of shown in FIG. 4a, after two user operations were carried out. Messages 230 and 234, which had previously been listed in the priority viewport 210 in FIG. 4a, are now shown in FIG. 4b in the non-priority viewport 240. It will be noted that both messages 230 and 234 in FIG. 4b are indicated by open envelope icons, indicating that they had been read. In the example described above with reference to the settings depicted in FIG. 5, it can be seen that the display 422 was refreshed, reflecting the fact that the messages 230 and 234 were read (and possibly replied to or forwarded), causing the priority values associated with those messages to be incremented by a negative value sufficient to bring the associated priority values below the threshold set for prioritized messages. Thus, the count of unread prioritized messages indicated by the icon 217 is reduced by two, and likewise the count of unread messages indicated by the icon 219 is reduced by two.

Figure 7B:
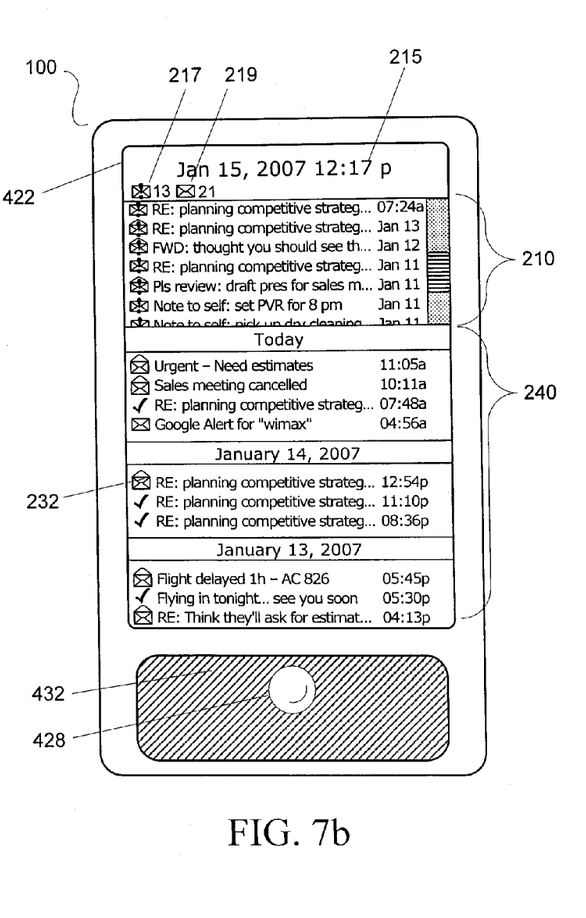

As noted above, a user operation that may constitute an event triggering the dynamic association of a priority value with a message may be the execution of a command altering or editing the priority level of a prioritized or non-prioritized message. With reference to FIG. 7a, a priority level, previous stored in accordance with step 335 of the method depicted in FIG. 6, may be overridden by the user. FIG. 7 shows the display 422 displaying a message, which corresponds to the message 232 indicated in FIGS. 4a and 4b as a prioritized message. The display in this embodiment preferably includes the priority level 260 (here indicated as "highest"), with an "edit" command, and the content of the message 265. In FIG. 7a, the "edit" command has been invoked, resulting in an overlay menu of options 270 to alter the priority level of the displayed message. In an alternate embodiment, the overlay menu of options 270 may be automatically displayed to the user when the user attempts to close the message display 260, 265. If the option "Set to Normal" is selected, the priority level of the displayed message is edited to the "normal" level; in this embodiment, this results in the demotion of the message to a non-prioritized message, to be displayed in the non-priority viewport 240. As can be seen in FIG. 7b, which may be considered to be a screen displayed subsequent to FIG. 4b, this has occurred; the listing of message 232 now appears in the non-priority viewport 240, and the unread prioritized message count 217 remains constant at thirteen, because the message 232 had already been read as indicated in FIG. 4b.

Another event, as described above, may be the determination that the message has reached or exceeded a certain age; for example, messages that are older than a predetermined number of days may be automatically incremented by a negative value in a manner similar to that described above. Thus, for example, messages older than one week may be automatically reduced to normal priority (this option is not depicted in FIG. 5, but it will be appreciated that such an option may be provided), on the assumption that the message is lower priority in the user's estimation than what had initially been determined by the system, based on the fact that the user had failed to act on the message. Alternatively, the system may be configured to increase the priority level of a message if it is not read within a certain period of time.

Thus, it can be seen that in the preferred embodiment, an initial priority level is assessed and assigned to each message by the messaging module as it is received by the mobile communication device 100 and stored in the message store 104. The priority level value is stored in association with the received message, for example by inserting the priority level value in a key-value pair in the header of the received message (for example, X-Display-Priority: Y, where Y is a numeric value), or by storing the priority level value in a file or database field associated with the received message. The priority level for a given received message is reassessed each time a further action is taken on the message, and the stored priority level value is updated to reflect a new reassessed value; thus, when the message is opened for reading or playback (an action which is often referred to as "reading" the message, whether the user actively reads or listens to the content of the message or not) or other activities are undertaken with respect to the message, the messaging application 424N evaluates the priority level of the message in view of the further actions or other criteria associated with the message. Upon execution of the action on the message, the priority viewport is refreshed on the display 422 of the mobile communication device 100.

It will be appreciated that by providing a system and method in accordance with the preferred embodiment, the priority viewport is dynamically refreshed or updated each time there is a detected event triggering an evaluation of a priority level associated with a message. This avoids the need for a user to perform a search or sort, if indeed the messaging application 424N provides searching or sorting capabilities, in order to locate all messages of sufficient importance that need to be brought to the user's attention, and the delay inherent in performing such a search or sort in order to locate the messages of sufficient importance.

Furthermore, by providing a static priority viewport 210, rather than a dialog box, or a resizable, minimizable, or hidable pane or window, the prioritized messages are always given a prominent display with increased likelihood that the user will notice and attend to those messages. The preferred embodiment provides the further advantage that messages that are displayed in the priority viewport 210 are not listed elsewhere in the messaging application user interface, for example in the non-prioritized viewport 240, thus eliminating potential confusion on the part of the user.

The preferred embodiment also provides the advantage of determining the relative priority of received messages based on the recipient's own handling of those messages, rather than purely on the subjective estimation of the sender of the message.

In a further embodiment with reference to FIG. 2, the host or desktop system 35 may be provided with a messaging application providing the same functionality as that described above with reference to the communication device 100. Preferably, messages received at the host system 35 are synchronized with the message store 104 at the communication device, either via direct connection or over the air. This may be accomplished using the redirection software 45 at the message server 40. If the host system 35 is configured to associate a priority level with received messages in a manner similar to that described above, preferably the stored priority values are also forwarded to the communication device 100 either by the host system 35 directly, or by the message server 40. The message server 40 itself may be configured to assess the priority value upon receipt of an incoming message at the message server. In that case, the step of determining an initial priority value 310 at the communication device 10 may comprise correlating the received message with a priority value already previously assessed at the host system 35.

It will be appreciated that the above system and method, while described principally in relation to e-mail messages, may apply equally to instant messages, short message service messages, multimedia messages, and other forms of digitally storable messages. The above system and method may also be implemented with voicemail messages that are received at the communication device 100.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method, comprising:
 associating a value with each message of a plurality of received messages, the plurality of received messages being initially unread on receipt, at least one of the plurality of received messages being associated with a value meeting a specified threshold;
 concurrently displaying, on a device display, a first message listing and a second message listing,
  the first message listing comprising entries for messages of the plurality of received messages associated with a value meeting the specified threshold; and
  the second message listing comprising entries for other messages of the plurality of received messages; and
 when a message associated with a value meeting the specified threshold and having an entry in the first message listing is marked read,
  updating the displayed first message listing and second message listing to remove the entry for the message from the first message listing and to include an entry for the message in the second message listing.

2. The method of claim 1, wherein the message being marked as read causes the message to no longer meet the specified threshold.

3. The method of claim 1, wherein the value associated with each message of the plurality of received messages is computed after receipt of the received message.

4. The method of claim 1, wherein the value associated with each message of the plurality of received messages is computed at a server receiving the message prior to delivery of the message by the server to a user device associated with the server.

5. The method of claim 4, further comprising the user device:
 receiving each message of the plurality of received messages; and
 receiving, for each message, the value computed by the server,
 wherein associating the value with each message of the plurality of received messages comprises the user device correlating each message with a corresponding received value.

6. The method of claim 1, further comprising, when the message associated with the value meeting the specified threshold and having the entry in the first message listing is marked read, updating the message's associated value to a value not meeting the specified threshold.

7. The method of claim 1, wherein the specified threshold comprises a numeric value.

8. The method of claim 1, wherein the specified threshold comprises a text expression.

9. The method of claim 1, further comprising, after updating the first message listing and second message listing:
 receiving an input instruction altering a value associated with one of the messages of the plurality of received messages; and
 further updating the displayed first message listing and second message listing based on the alteration of said value.

10. The method of claim 1, wherein the second message listing includes messages transmitted from the communication device.

11. A communication device, including:
 at least one communications subsystem;
 a display; and
 a processor adapted to enable:
  receiving, via the at least one communications subsystem, a plurality of received messages, the plurality of received messages being initially unread on receipt and each message of the plurality of received messages being associated with a value, at least one of the plurality of received messages being associated with a value meeting a specified threshold;
  concurrently displaying, on the display, a first message listing and a second message listing,
   the first message listing comprising entries for messages of the plurality of received messages associated with a value meeting the specified threshold; and
   the second message listing comprising entries for other messages of the plurality of received messages; and
  when a message associated with a value meeting the specified threshold and having an entry in the first message listing is marked read,
   updating the displayed first message listing and second message listing to remove the entry for the message from the first message listing and to include an entry for the message in the second message listing.

12. The communication device of claim 11, wherein the message being marked as read causes the message to no longer meet the specified threshold.

13. The communication device of claim 11, wherein the value associated with each message of the plurality of received messages is computed after receipt of the received message.

14. The communication device of claim 11, wherein the value associated with each message of the plurality of received messages is computed at a server receiving the message prior to delivery of the message by the server to the communication device.

15. The communication device of claim 14, wherein the processor is further adapted to enable:
 receiving via the at least one communications subsystem, for each message, the value computed by the server; and
 associating each message with its corresponding received value.

16. The communication device of claim 11, wherein the processor is further adapted to enable, when the message associated with the value meeting the specified threshold and having the entry in the first message listing is marked read, updating the message's associated value to a value not meeting the specified threshold.

17. The communication device of claim 11, wherein the specified threshold comprises a numeric value.

18. The communication device of claim 11, wherein the specified threshold comprises a text expression.

19. The communication device of claim 11, wherein the processor is further adapted to enable, after updating the first message listing and second message listing:
- receiving an input instruction altering a value associated with one of the messages of the plurality of received messages; and
- further updating the displayed first message listing and second message listing based on the alteration of said value.

20. The communication device of claim 11, wherein the second message listing includes messages transmitted from the communication device.

\* \* \* \* \*